(12) United States Patent
White

(10) Patent No.: US 6,314,679 B1
(45) Date of Patent: Nov. 13, 2001

(54) WIDE ROW PLANTING TRAY

(76) Inventor: Steven J. White, 349 Glengary Loop Rd., Roseburg, OR (US) 97470-9313

( * ) Notice: Subject to any disclaimer, the term of this patent is extended or adjusted under 35 U.S.C. 154(b) by 0 days.

(21) Appl. No.: 09/563,196

(22) Filed: May 2, 2000

Related U.S. Application Data

(60) Provisional application No. 60/132,319, filed on May 3, 1999.

(51) Int. Cl.$^7$ ........................................... A01C 9/02
(52) U.S. Cl. .................... 47/901; 47/1.01 T; 47/1.01 R; 111/200
(58) Field of Search ................. 47/65.5, 74, 73, 47/1.01 T, 1.01 R, 901; 111/200

(56) References Cited

U.S. PATENT DOCUMENTS

| | | |
|---|---|---|
| 3,755,964 | 9/1973 | Rack . |
| 4,221,175 * | 9/1980 | Van Wingerden et al. .......... 111/200 |
| 5,060,418 | 10/1991 | Pullman et al. . |
| 5,218,783 | 6/1993 | Langezaal et al. . |
| 5,315,786 | 5/1994 | Smith et al. . |
| 5,400,544 * | 3/1995 | Wien ................................. 47/1.01 T |
| 5,605,012 | 2/1997 | Weder et al. . |
| 5,680,727 * | 10/1997 | Sakaue et al. ..................... 47/1.01 R |

FOREIGN PATENT DOCUMENTS

| | | |
|---|---|---|
| 06007005A * | 1/1994 | (JP) . |
| 06113680A * | 4/1994 | (JP) . |
| 06225641A * | 8/1994 | (JP) . |

* cited by examiner

Primary Examiner—Charles T. Jordan
Assistant Examiner—Judith A. Nelson
(74) Attorney, Agent, or Firm—Siemens Patent Services, LC

(57) ABSTRACT

A planting tray for discharging many sproutlings simultaneously onto a permanent growing bed. The tray comprises a peripheral rectangular frame which slidably supports a floor panel. A flexible web attaches to the front of the frame by a clamp, extends over the floor panel, around the rear edge of the floor panel, and extends along the bottom of the floor panel back to the front of the frame. When the free end of the web is pulled, the floor panel is ejected to the front of the frame in parbuckle fashion. The sproutlings are thereby discharged onto the growing bed. The floor panel preferably has a roller disposed along its rear edge to avoid binding on the web when the web is pulled. The frame has two cable handles.

7 Claims, 3 Drawing Sheets

WIDE ROW PLANTING TRAY

REFERENCE TO RELATED APPLICATION

This application is related to Provisional Patent Application Ser. No. 60/132,319, filed May 3, 1999.

BACKGROUND OF THE INVENTION

1. Field of the Invention

The present invention is a transfer device which deposits pre-sprouted small plants onto a final growing bed containing growing medium, such as soil. The novel transfer device is intended to deposit in a single operation a plurality of sproutlings onto prepared ground of, for example, a garden, in numbers far greater than could be feasibly accomplished by hand. The invention finds application in gardening or planting operations wherein more than a handful of sproutlings are to be deposited in a single bed. Illustratively, individual consumers who plant more than a handful of sproutlings at one time, small commercial nurseries, research facilities, and institutions could profitably employ the present invention.

2. Description of the Prior Art

Planting large quantities of small, newly sprouted plants usually requires apparatus for handling the sproutlings in a manner appropriate for planting. Plants typically require that they be properly oriented with roots facing downwardly to assure successful establishment in the new planting bed. Also, there is usually a requirement for appropriate spacing from one sproutling to the next to promote vigorous growth.

Considerable care must be exerted in handling young plants to assure health and survival. Notably, root balls must be maintained intact to afford the opportunity for the young plant to establish itself in its new growing location. To answer this requirement, plants are usually sprouted in inexpensive, plastic trays incorporating a plurality of individual receptacles formed therein. Each receptacle accommodates one plant. When the plant is to be transplanted, it is usually removed from the receptacle and replanted by hand. This is a cumbersome, inefficient process when applied to large numbers of plants. Accordingly, the commercial nursery establishment has attempted to automate or otherwise improve efficiency of the process of growing and transplanting young plants.

U.S. Pat. No. 5,218,783, issued to Lucas E. Langezaal et al. on Jun. 15, 1993, describes a plug strip for holding agroplugs during planting. The strip is intended to release each agroplug as the latter is pressed therefrom. However, planting requires that each agroplug be pressed from engagement with the strip. In the present invention, the base or floor of a device corresponding to the plug strip is slid out from under sproutlings. There is no need in the present invention to press sproutlings downwardly, nor to handle agroplugs or plants individually, as is performed by Langezaal et al. Rather, in the present invention, a large number of sproutlings are deposited en masse by sliding the floor out from the remaining carrier structure.

U.S. Pat. No. 5,060,418, issued to Gerald S. Pullman et al. on Oct. 29, 1991, describes a method of transplanting young plants to a permanent growing bed. The method includes the step of treating the growing medium, such as soil, at an appropriate stage of growth such that it becomes lightly bonded. That is, the growing medium is caused to cake or otherwise harden or solidify to the point that the growing medium surrounding each plant can be extracted from a container originally containing many sproutlings and handled as a plug which resists immediate disintegration which would result if the growing medium were still in comminuted or particulate form. By contrast with the approach of Pullman et al., the present invention does not rely on binding the growing medium into one or more generally solid, cohesive masses. Instead, the novel apparatus has the ability to transfer young plants and surrounding growing medium to a new growing environment without requiring that the growing medium be rendered cohesive. Also, this transfer is accomplished en masse, rather than requiring that plants be handled as individual plugs, as performed by Pullman et al.

U.S. Pat. No. 3,755,964, issued to David Rack on Sep. 4, 1973, illustrates a multi-plant tray formed from a material which is more permeable to air and water, and penetrable by plants, than are typical plant trays. However, this tray lacks apparatus enabling ready transfer of partially developed plants to a permanent growing bed, as occurs in the present invention.

U.S. Pat. No. 5,605,012, issued to Donald E. Weder et al. on Feb. 25, 1997, describes a container for holding one or more young plants. There is no apparatus associated therewith for readily transferring plants to a permanent growing bed, as seen in the present invention.

U.S. Pat. No. 5,315,786, issued to Thomas Smith et al. on May 31, 1994, describes a planting tray which is abandoned in place in a permanent growing bed. The tray is biodegradable and disintegrates over time after planting. By contrast, the present invention is not abandoned in place. Rather, it readily releases young plants to the new growing bed, and is removed from the site.

None of the above inventions and patents, taken either singly or in combination, is seen to describe the instant invention as claimed.

SUMMARY OF THE INVENTION

The present invention sets forth a planting tray which deposits a great many sproutlings en masse onto a permanent growing bed. The planting tray carries the sproutlings on a retractable floor supported on a frame. The floor is drawn out from the tray from under the sproutlings when the planting tray is placed over the permanent growing bed. The sproutlings, now unsupported from below, fall onto the permanent bed. The planting tray is placed directly onto the growing bed, so that the distance the sproutlings fall is negligible.

In a preferred method of use, the sproutlings are first sprouted from seeds in a subdivided container such as of the type known as "nursery flats". The bottoms of each receptacle of the nursery flat are cut from the nursery flat. The nursery flat is laid on the tray and pulled upwardly, leaving the sproutlings resting on the tray. The tray is then carried to the permanent growing bed. When the tray is positioned on the bed as desired, the floor is drawn out and the sproutlings are discharged to the growing bed.

Alternatively, the nursery flat can be left in place on the tray and removed after the sproutlings have been discharged to the growing bed. In a further alternative, the nursery flat can be placed on the tray above a web which is used to operate the invention. The flat and its sproutlings, carried on the tray, can then be transferred to a frame associated with the novel planting tray, and transferred to the permanent growing bed as summarized above. In a still further alternative, plants can be sprouted directly on the web and tray without a nursery flat. After germination, the young plants can be transferred to the growing bed using the frame.

These procedures utilizing the invention enable a great many individual plants to be sprouted from seeds and deposited on the permanent bed with minimal handling of individual plants. The invention renders unnecessary handling of plants individually.

Accordingly, one object of the invention is to enable many young plants to be transferred expeditiously onto on a permanent growing bed from a nursery flat.

Another object of the invention is to minimize direct handling of young plants being transferred to a permanent growing bed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
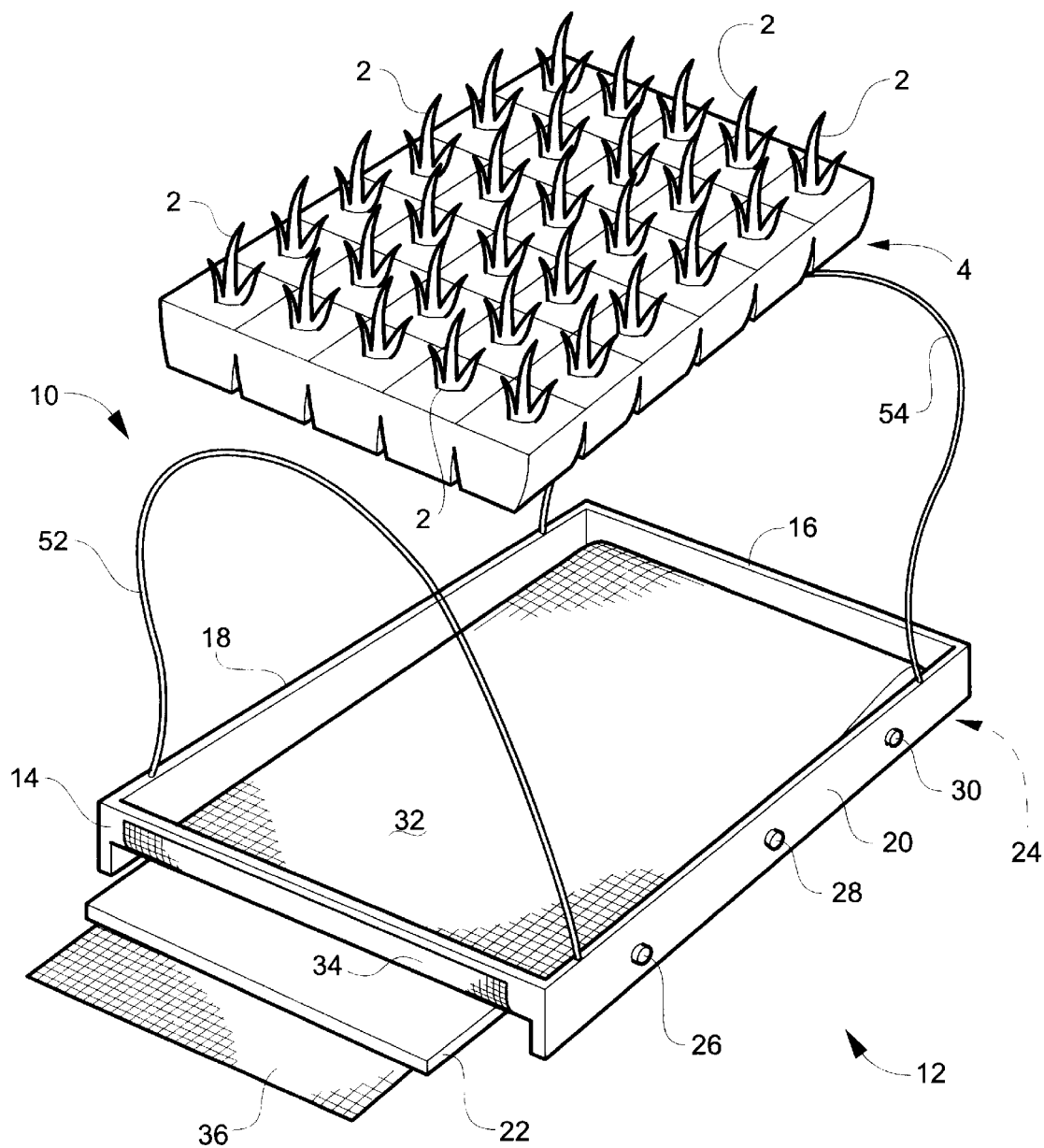
FIG. 1 is a partially exploded, environmental perspective view of an embodiment of the invention.

FIG. 1 of the drawings shows planting tray 10 for depositing sprouted plants 2 onto a growing bed (not shown). Plants 2 are shown growing in a growing medium such as potting soil in a nursery flat 4. Planting tray 10 includes a peripheral frame 12 open at the bottom, having a front side including a front member 14, a rear member 16, a left side member 18, and a right side member 20. Side members 18, 20 span and connect front member 14 and rear member 16 in the manner of a rectangular box frame. A rigid floor panel 22 is disposed at the open bottom of frame, floor panel 22 being received just below front member 14 and between side members 18, 20. Floor panel 22 is separate from and slidably disposed relative to frame 12. Floor panel 22 has a rear edge 24 disposed proximate rear member 16 of frame 12 in the depiction of FIG. 1. Floor panel 22 is carried on support elements such as pins 26, 28, 30 which pass through holes (not visible in FIG. 1) formed in side members 18, 20.

A flexible web 32 wraps around and ejects floor panel 22 from its position nested within frame 12. Web 32 has a first end 34 anchored in any suitable way along front member 14. Web 32 extends from front end 34 of web 32 towards rear member 16 of frame 12 above floor panel 22, to pass around rear edge 24 of floor panel 22, and extends beneath floor panel 22 as it projects towards and beyond front member 14 of frame 12. Free end 36 of web 32 projects to the front of floor panel 22, where it is exposed to be grasped when ejecting floor panel 22 from its position covering the open bottom of frame 12.

Figure 2:
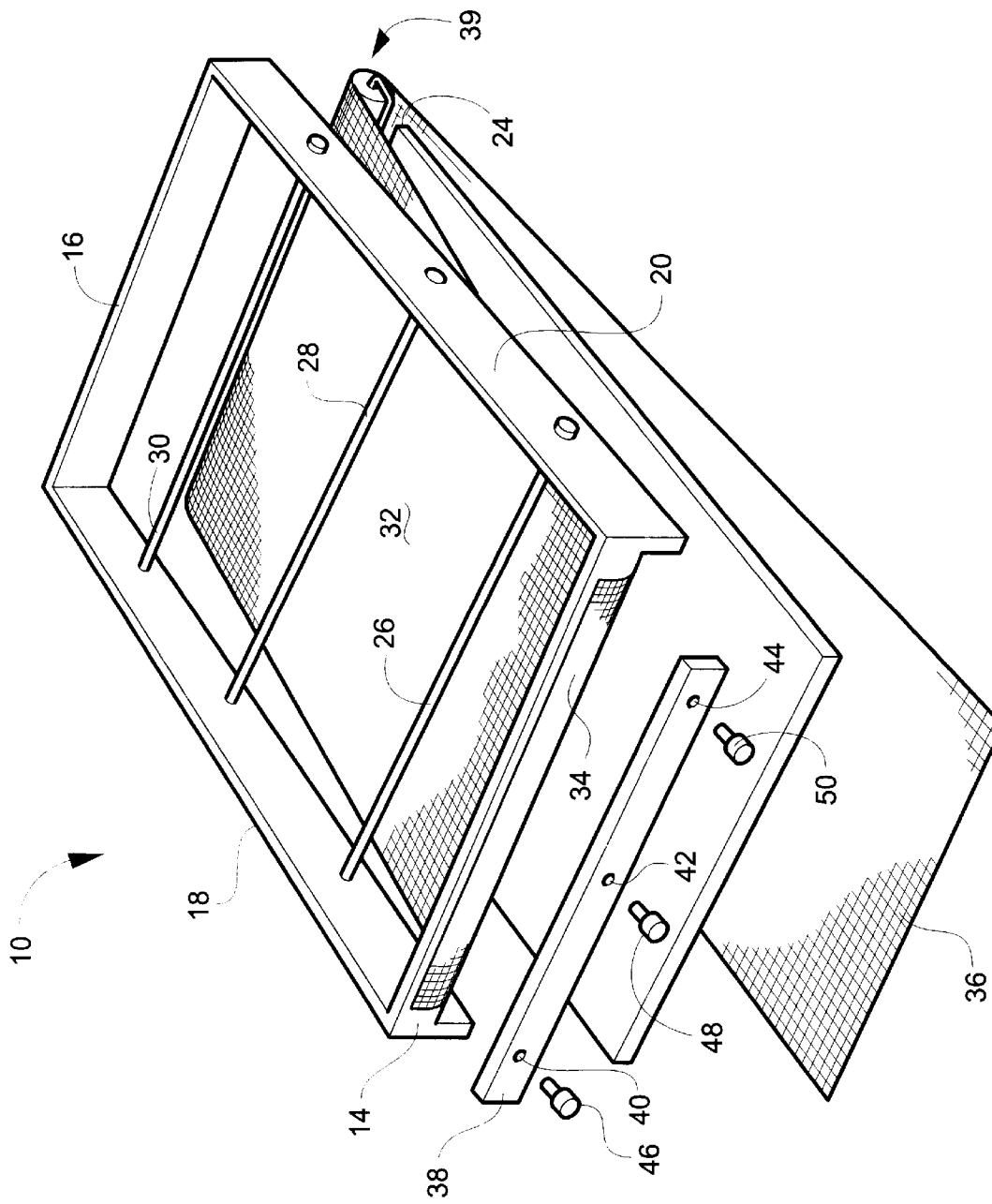
FIG. 2 is a partially exploded, perspective view of another embodiment of the invention, shown in a diagrammatic configuration adapted to illustrate structural detail rather than to depict realistic conditions of use.

Relationship of web 32 to floor panel 22 is clearly seen in FIG. 2. Web 32 passes around a roller 39 which enables rolling engagement between floor panel 22 and web 32 to occur when web 32 is pulled to eject floor panel 22.

FIG. 2 also shows a preferred way of securing web 32 to front member 14 of frame 12. Front end 34 of web 32 is releasably attached to front member 14 by a clamp. The clamp includes a bar 38 having holes 40, 42, 44 disposed to accept threaded shanks of screws 46, 48, 50. Screws 46, 48, 50 engage threaded holes (not shown) formed in front member 14 of frame 12. Tightening screws 46, 48, 50 through bar 38 releasably anchors first end 34 of web 32 to frame 12.

FIG. 2 clearly shows pins 26, 28, 30, which are removably inserted into close fitting holes formed in side members 18, 20 of frame 12. Pins 26, 28, 30 bear the weight of floor panel 22 and the load imposed by nursery flat 4. Pins 26, 28, 30 optionally rotate in their supporting holes. Pins 26, 28, 30 have smooth surfaces enabling web 32 to slide therealong with minimal resistance when web 32 is pulled to eject floor panel 22, as will be explained hereinafter.

Referring again to FIG. 1, frame 12 has at least one, and preferably two handles 52, 54 attached thereto. Handles 52, 54 support frame 12 when fully loaded in a stable, symmetrical manner, while deflecting to enable ready installation of nursery flat 4 onto web 32 and floor panel 22. Handles 52, 53 are spaced apart, flexible cables attached to frame 12.

Figure 3:
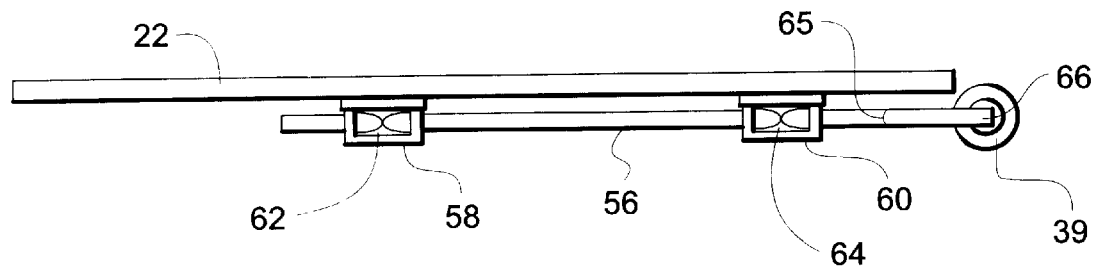
FIG. 3 is a side elevational detail view of the center of FIG. 2.

One arrangement for securing roller 39 to floor panel 22 is shown in FIG. 3. A rod 56 is clamped to floor panel 22 by brackets 58, 60 which are secured by bolts 62, 64. Rod 56 forms right angle bends 65, 66, thereby assuming a configuration similar to that of a conventional paint roller. That end of rod 56 not secured by brackets 58, 60 forms an axle about which roller 39 turns. Roller 39 may be any suitable device such as an annular piece of elastomeric material or even a section of hose.

Figure 4:
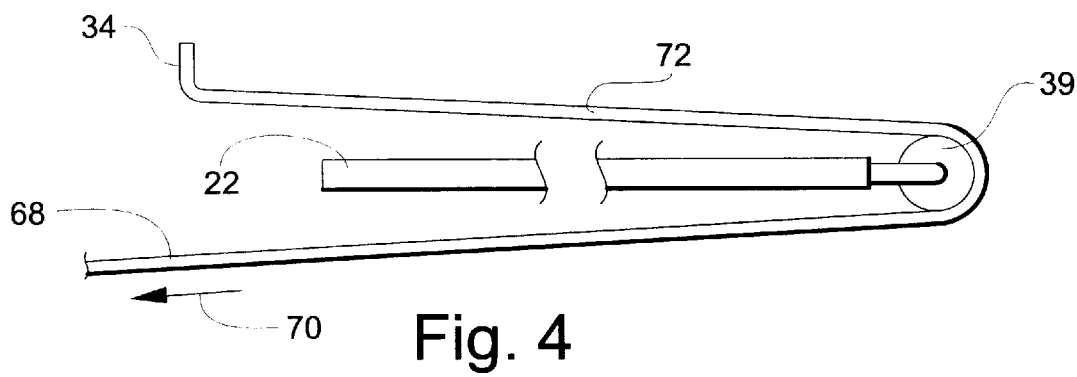
FIG. 4 is a diagrammatic, side elevational view illustrating ejection of the tray from the planting tray by parbuckle action.
Figure 5:
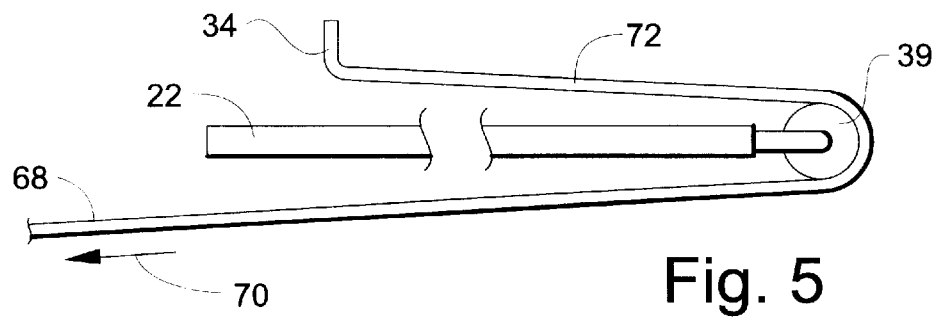
FIG. 5 is similar to FIG. 4, but shows a subsequent stage of ejection.
Figure 6:
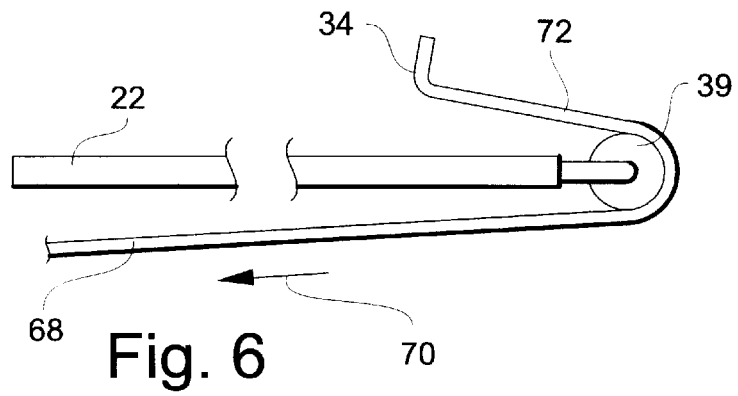
FIG. 6 is similar to FIG. 5, but shows a further subsequent stage of ejection.

FIGS. 4–6 illustrate how web 32 ejects floor panel 22 towards the front of planting tray 10 when web 32 is pulled by its free end 36. Referring first to FIG. 4, when section 68 of web 32 is drawn towards the front of planting tray 10, where the front is that side including front member 14, web 32 rolls on roller 39. Because first end 34 of web is fixed to frame 34, floor panel moves to the left, as depicted in FIG. 4. FIGS. 5 and 6 show how floor panel 22 is progressively moved to the left as pulling of section 68 of web 32 in the direction of arrow 70 continues. It will be seen by comparing FIGS. 4, 5, and 6 that as section 68 of web 32 becomes progressively longer, section 72 becomes correspondingly shorter. Web 32 does not bind on floor panel 22 due to rotation of roller 39, which serves as a roller bearing. Web 32 is fabricated from a thin and flexible material strong enough to withstand resistance of floor panel 22 as ejection proceeds.

The present invention is susceptible to variations and modifications which may be introduced thereto without departing from the inventive concept. For example, pins 26, 28, 30 could be replaced by guides (not shown) formed by bending the lower extremities of frame side members 18, 20 inwardly. Web 32 could be replaced by a cable system (not shown). Rod 56 supporting roller 39 may be embedded within floor panel 22 in the manner shown in FIGS. 4–6 or otherwise mounted, rather than being attached by brackets 58, 60.

It is to be understood that the present invention is not limited to the embodiments described above, but encompasses any and all embodiments within the scope of the following claims.

I claim:

1. A planting tray for depositing sprouted plants onto a growing bed, comprising:
    a peripheral frame open at the bottom, having a front including a front member, a rear member, a first side member spanning and connecting said front member and said rear member, and a second side member spanning and connecting said front member and said rear member;
    a rigid floor panel disposed at said open bottom of said frame, wherein said floor panel is separate from said frame, having a rear edge disposed proximate said rear member of said frame;
    support elements disposed to support said floor panel at said open bottom of said frame;
    a flexible web having a first end anchored along said front member of said frame and a free end, disposed to extend towards said rear member of said frame over said floor panel, to pass around said rear edge of said floor panel, to extend beneath said floor panel, and to project towards and beyond said front member of said frame, wherein said web is disposed to eject said floor panel towards the front of said tray when said web is pulled by said free end in a direction from said rear member of said frame to said front member of said frame.

2. The planting tray according to claim 1, wherein said floor panel includes a roller disposed to enable rolling engagement between said floor panel and said flexible web when said flexible web is pulled to eject said floor panel.

3. The planting tray according to claim 1, further comprising a clamp releasably attached to said front member, wherein said clamp is disposed to releasably anchor said flexible web to said frame.

4. The planting tray according to claim 1, wherein said support elements comprise pins removably insertable into said frame.

5. The planting tray according to claim 1, further comprising at least one handle attached to said frame.

6. The planting tray according to claim 1, further comprising a first flexible handle attached to said frame and a spaced apart second flexible handle attached to said frame.

7. A planting tray for depositing sprouted plants onto a growing bed, comprising:
    a peripheral frame open at the bottom, having a front including a front member, a rear member, a first side member spanning and connecting said front member and said rear member, a second side member spanning and connecting said front member and said rear member, and two spaced apart flexible handles attached to said frame;
    a rigid floor panel disposed at said open bottom of said frame, wherein said floor panel is separate from said frame, having a rear edge disposed proximate said rear member of said frame and a roller;
    support elements disposed to support said floor panel at said open bottom of said frame, comprising pins removably insertable into said frame;
    a flexible web having a first end anchored along said front member of said frame and a free end, disposed to extend towards said rear member of said frame over said floor panel, to pass around said rear edge of said floor panel, to extend beneath said floor panel, and to project towards and beyond said front member of said frame, wherein said web is disposed to eject said floor panel towards the front of said tray when said web is pulled by said free end in a direction from said rear member of said frame to said front member of said frame; and
    a clamp releasably attached to said front member, wherein said clamp is disposed to releasably anchor said flexible web to said frame,
    wherein said floor panel includes a roller disposed to enable rolling engagement between said floor panel and said flexible web when said flexible web is pulled to eject said floor panel.

* * * * *